Patented June 27, 1939

2,164,188

UNITED STATES PATENT OFFICE 2,164,188

ESTERIFICATION OF ALLYL TYPE ALCOHOLS AND PRODUCTS RESULTING THEREFROM

Herbert P. A. Groll, Oakland, and George Hearne, Berkeley, Calif., assignors to Shell Development Company, San Francisco, Calif., a corporation of Delaware No Drawing. Application May 16, 1934, Serial No. 725,967

22 Claims. (Cl. 260—488)

This invention is concerned with a novel and useful process for the esterification of allyl type unsaturated alcohols and embraces certain novel unsaturated carboxylic acid esters and their mode of preparation.

More particularly our invention relates to a process for the production of unsaturated carboxylic acid esters containing the organic residue of an allyl type alcohol linked to a carboxyl group which comprises effecting the reaction of an allyl type alcohol with a carboxylic acid.

A study of the art to which our invention pertains reveals the fact that numerous investigators have attempted to prepare saturated carboxylic acid esters by effecting the reaction of carboxylic acids with saturated alcohols. While it is well known that the esterification may be thereby effected, it has been repeatedly demonstrated that the reaction proceeds too slowly and incompletely to render the method adaptable to an economical commercial scale process.

Now we have found that, according to the present invention, unsaturated esters of the type herein described may be readily and economically prepared in high yields by the simple procedure of heating an allyl type alcohol with a carboxylic acid in the absence of a catalyst for the esterification reaction.

An object of our invention is to provide a novel, economical and practical process adaptable to the technical scale production of hitherto difficultly obtainable and in some cases unknown unsaturated carboxylic acid esters.

The unsaturated alcohols which may be esterified in accordance with this invention are characterized by possessing a carbinol group linked to an aliphatic unsaturated carbon atom. Such unsaturated alcohols may for purposes of convenience be termed "allyl type alcohols", since they comprise the grouping

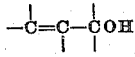

which is characteristic of allyl alcohol and its homologues, analogues and substitution products.

Allyl type alcohols with which we are particularly concerned contain at least one

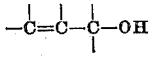

grouping regardless of the character of the organic compound in which such a grouping may be contained. The grouping may comprise part of an iso or normal alkyl chain which may or may not be attached to a cyclic radical as of the aromatic, alicyclic and heterocyclic series, or may comprise part of an alicyclic structure. A preferred group of allyl type alcohols includes those containing an unsaturated tertiary carbon atom. These unsaturated alcohols may be represented by the formula

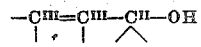

wherein at least one of the $C^{III}$ carbon atoms is tertiary, that is, linked to three other carbon atoms. The carbon atom represented by $C^{II}$ may be of primary, secondary or tertiary character. The loose bonds may be taken up by hydrogen, halogen, hydroxy, alkyl, alkoxy, carbocyclic, heterocyclic, aralkyl, aralkoxy, aryloxy, and/or other suitable organic radicals which may or may not be further substituted, or they may be taken up by suitable monovalent substituents; it being understood that a carbinol carbon atom is not linked to a halogen atom or to another hydroxyl group.

Allyl type alcohols include among others compounds such as

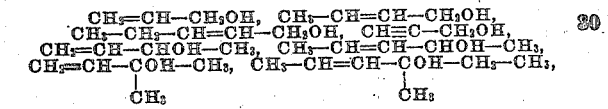
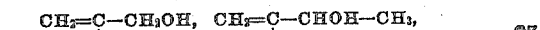
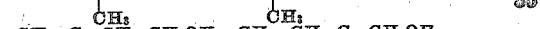
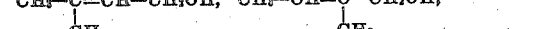
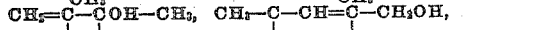
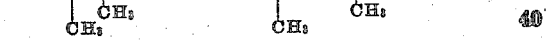
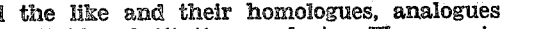
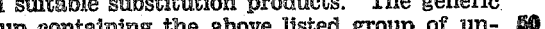

and the like and their homologues, analogues and suitable substitution products. The generic group containing the above listed group of unsaturated alcohols is intended to include all allyl type alcohols containing one or a plurality of double or triple bonds and one or more carbinol groups which may be of primary, secondary or tertiary character.

We are particularly interested in effecting the esterification of allyl type alcohols possessing an unsaturated tertiary carbon atom. Alcohols of this type are, by our method, readily esterified in the absence of a catalyst at relatively lower temperatures than the corresponding straight chain compounds to yield valuable unsaturated esters many of which are novel compositions of matter.

Ordinarily, we may execute our invention without resorting to the use of a catalyst for the esterification reaction. We have found that allyl type alcohols which do not contain an unsaturated tertiary carbon atom such as allyl alcohol and its homologues are, in the absence of a catalyst, esterified more slowly and less completely than the corresponding compounds containing an unsaturated tertiary carbon atom when treated under identical conditions. However, when reacting those alcohols of straight chain allyl structure we may accelerate the rate of the esterification reaction considerably by conducting it in the presence of a small amount of a mineral acid or acid acting catalyst under substantially anhydrous conditions. In accordance with the present invention, we cannot effect the esterification of allyl type alcohols containing an unsaturated tertiary carbon atom in the presence of a mineral acid or acid acting catalyst, since those alcohols under the conditions of operation and in the presence of said catalyst are substantially completely converted to the corresponding aldehydes or ketones by molecular rearrangement.

Suitable catalysts which may be employed when it is desired to accelerate the rate of esterification of allyl type alcohols which do not contain an unsaturated tertiary carbon atom include the strong mineral acids such as $H_2SO_4$, $H_3PO_4$, $H_2S_2O_7$, $HPO_3$, $HCl$, $HBr$, $H_4P_2O_7$, $HClO_3$, $HClO_4$, $HNO_3$ and the like. We may also utilize mineral acid constituents such as $SO_2Cl_2$, $SOCl_2$, $SOBr_2$, $NO_2$, $N_2O_3$, $NOCl$, $POCl_3$, $PCl_3$, $PCl_5$ and the like. When desired, we may use inorganic acid acting salts as $ZnSO_4$, $ZnCl_2$, $ZnBr_2$, $FeCl_3$, $AlCl_3$, $CoCl_2$, $NiCl_2$, $Fe_2(SO_4)_3$, $Al_2(SO_4)_3$, $NaHSO_4$, $ZnH_2(SO_4)_2$, $NaH_2PO_4$ and the like, or we may employ organic acid acting compounds such as benzene sulphonic acid and its homologues and analogues, dialkyl and acid alkyl sulphates, alkylated phosphoric and sulphonic acids, etc.

The term "carboxylic acid" as used in this specification and the accompanying claims is intended to include those organic compounds possessing one or a plurality of organic acid carboxyl groups. Those compounds containing one —COOH group are designated as monobasic carboxylic acids, while those containing a plurality of —COOH groups are termed polybasic carboxylic acids. The carboxylic acids suitable for use in the execution of the present invention may be of aliphatic, cyclic or aralkyl character and may or may not be further substituted. They may be saturated or unsaturated and be of monobasic or polybasic character. Suitable carboxylic acids include acids such as formic, acetic, propionic, butyric, isobutyric, valeric, acrylic, propionic, crotonic, tiglic, benzoic, phenyl-acetic, cinnamic, oxalic, malonic, succinic, glutaric and the like and their homologues, analogues and substitution products. Suitable hydroxyl, carbonyl and halogen substituted carboxylic acids include lactic, glycollic, hydroxybutyric, malic, citric, glyoxallic, pyruvic, aceto-acetic, chlor-acetic, alpha and beta chlor-propionic, chlor-isobutyric and the like and their homologues, analogues and substitution products.

We have found that in some cases when an allyl type alcohol containing a primary or secondary carbinol group and an unsaturated tertiary carbon atom is reacted with oxalic acid, rearrangement of the alcohol as well as its esterification may occur. The main reaction product is usually the corresponding oxalate but a certain amount of the alcohol is rearranged to a carbonylic compound. Allyl type alcohols which do not contain an unsaturated tertiary carbon atom may be reacted with oxalic acid to form substantially only the corresponding unsaturated oxalate.

Our invention may be executed in a wide variety of different manners. In a preferred mode of operation, the esterification is effected by heating the unsaturated alcohol in contact with an excess of a carboxylic acid. The reactants are introduced into a suitable reaction vessel equipped with means for agitating and heating its contents. The reactants may be introduced into the reaction vessel independently or they may be mixed prior to their introduction therein. Ordinarily we prefer to employ an excess of the carboxylic acid over the unsaturated alcohol in the reaction mixture, however, when desired, an excess of the alcohol or equimolecular quantities of the reactants may be used.

In the majority of cases, the esterification is effected by heating the reactants in contact with each other at the boiling temperature of the reaction mixture under atmospheric pressure. The rate of the reaction may be accelerated by resorting to the use of superatmospheric pressure and higher temperatures. It is desirable that intimate contact of the reactants be effected by some suitable agitating means such as mechanical stirring.

We may increase the rate of the esterification reaction and prevent the occurrence of undesirable side reactions such as polymerization, condensation and hydrolysis of the reaction product by operating in such a manner that the unsaturated ester and/or water are removed from the reaction mixture substantially as soon as they are formed. This removal may in some cases be effected by executing the process at a temperature sufficiently high to permit distillation of the ester and/or water from the reaction mixture. We may operate with a distilling or fractionating apparatus in communication with the reaction vessel in such a manner that vapors from the latter are introduced into a suitable portion of the separating column. We may, in many cases, operate the distilling apparatus under a heavy reflux and distill azeotropic mixtures comprising the unsaturated ester, water and other constituents of the reaction mixture from the reaction vessel. The mixtures distilled may be multiple azeotropic mixtures of the ester and water with the alcohol and/or acid or mixtures which while not of azeotropic composition nevertheless boil at temperatures lower than the boiling temperatures of their constituents. It may be desirable to aid the removal of the ester and/or water by effecting the reaction in the presence of an inert substance which under the conditions of operation will form low boiling azeotropic mixtures with the reaction products. Suitable substances for this purpose include hydrocarbons, alcohols, ethers, esters and the like.

The vapors removed from the reaction vessel may be condensed and the unsaturated ester recovered therefrom by any suitable means such as stratification, fractionation, extraction, salting out, use of drying agents and the like. The unsaturated esters may be recovered in a substantially pure state by subjecting the condensate to treatment in a series of suitable fractionating columns. The particular recovery system to be employed is dependent on the physical and especially on the azeotropic properties of the condensate and its constituents. Any unreacted alcohol and/or carboxylic acid recovered from the condensate may be conducted back to the reaction vessel and reutilized therein.

In some cases under the conditions of temperature and pressure under which it is desirable to operate, the ester formed cannot be conveniently removed from the reaction vessel by distillation. We may, however, accelerate the reaction and substantially prevent hydrolysis of the ester by distilling water from the reaction mixture at about the same rate as it is formed therein. Other similar or related expedients may be availed of to increase the efficiency of the operation. For example, the reaction may be conducted in the presence of a substance capable of combining with the water and thereby effecting its removal from the reaction mixture substantially as soon as it is formed. Such substance which can be employed for this purpose include anhydrous salts which are capable of adding water of crystallization. When the reaction is complete, the ester may be separated from the reaction mixture by distillation, stratification, centrifugation, extraction or any other suitable means. In some cases the reaction mixtures may be utilized for solvent or extraction purposes or as intermediates in the preparation of other compounds without resorting to separation of the constituents.

It will be apparent that our process may be executed in a batch, intermittent or continuous manner. When it is desired to execute our invention in a continuous manner in accordance with the above described mode of procedure, we may have a suitable reaction stage or stages in communication with one or a plurality of separation and purification stages. The volume of the reaction mixture and the relative concentrations of the reactants in the reaction stage or stages may be kept substantially constant by the intermittent or continuous introduction therein of the reactants at about the same rate at which they are reacted and the products removed from the reaction mixture. The reactants separated from the condensed distillate may be reutilized by introducing them into a reaction stage as a mixture, independently or in conjunction with the main reactant feed or feeds.

As an alternative mode of operation, the esterification may be effected in a reaction column into which the reactants may be introduced at one or a plurality of zones; the location of said zones being dependent on the relative boiling temperatures of the particular reactants, products and constant boiling mixtures which may be formed.

Unsaturated esters may be prepared by reacting a single allyl type alcohol with a single carboxylic acid. Thus the character of the unsaturated ester may be controlled by varying the character of the interacting alcohol and/or carboxylic acid. On the other hand mixed esters may be prepared by reacting a mixture of different species of unsaturated allyl type alcohols with a single acid or a single alcohol may be reacted with a mixture of different species of carboxylic acids. The resulting mixtures of esters may be used without resorting to separation of the constituents or separation of the esters may be effected by any suitable means. For example, if there is a sufficiently great difference in the boiling temperatures of the esters, they may be separated by fractionation.

The following examples are introduced for the purpose of illustrating the mode and conditions of execution of our invention when certain specific unsaturated esters are prepared.

*Example I*

100 gm. (1.39 mols.) of anhydrous isobutenol $$(CH_2=C-CH_2OH)$$
$$\phantom{(CH_2=C-}|$$
$$\phantom{(CH_2=C-}CH_3$$

were mixed with about 150 gm. (2.5 mols.) of glacial acetic acid.

The above mixture was placed in the kettle of a distilling apparatus and vigorously boiled while the still column was adjusted so that only a small portion of the vapors ascending the column were allowed to pass over as distillate. The main bulk of vapors were condensed in the still head and utilized as reflux. The condensed distillate was a mixture comprising isobutenyl acetate, water, isobutenol and a small amount of acetic acid. The condensate was washed with water to remove the isobutenol, treated with $NaHCO_3$ to neutralize the acetic acid, dried and distilled.

Isobutenyl acetate was obtained in a yield of about 80% of the theoretical. The ester boiled at about 124° C. under atmospheric pressure.

*Example II*

100 gm. (1.39 mols.) of anhydrous isobutenol were mixed with about 150 gm. (1.70 mols.) of isobutyric acid.

This mixture was distilled under a heavy reflux substantially as described in Example I.

The condensed distillate was a mixture comprising isobutenyl isobutyrate, water, isobutenol, and isobutyric acid. This mixture was washed with water, treated with $NaHCO_3$, dried and distilled.

Isobutenyl isobutyrate was obtained in a yield of about 80%. The product, which is a new composition of matter, boils at a temperature of 152.5° C. under atmospheric pressure.

*Example III*

100 gm. (1.72 mols.) of anhydrous allyl alcohol were mixed with about 150 gm. (2.5 mols.) of glacial acetic acid.

The above mixture was charged to the kettle of a distilling apparatus and slowly distilled under a heavy reflux. It was observed that the rate of reaction was much lower than when the hydroxy compound reacted contained an unsaturated tertiary carbon atom. After about 50 cc. of distillate had been collected, the operation was discontinued and about 3 drops of concentrated sulphuric acid were added to the mixture in the kettle. By the use of sulphuric acid as an esterification catalyst, the rate of reaction was materially increased.

The condensed distillate was treated as described in the preceding examples.

Allyl acetate boiling at about 103° C. to 104° C.

at atmospheric pressure was obtained in a yield of about 76%. No rearrangement of the allyl alcohol to propionaldehyde was effected.

Example IV 113 gm. (0.896 mols.) of oxalic acid

[(COOH)₂.2H₂O]

were mixed with 255 gm. (3.54 mols.) of anhydrous isobutenol and the mixture was placed in the kettle of a dehydrating still.

The mixture was boiled and water was distilled from the reaction mixture until the reaction was complete. The condensed distillate contained in addition to water about 30 gm. of isobutyraldehyde formed by rearrangement of the isobutenol.

The residue was fractionated under a subatmospheric pressure. 120 gm. (0.605 mol.) of isobutenyl oxalate were obtained. This represents a yield of 94% based on the oxalic acid applied.

The isobutenyl oxalate

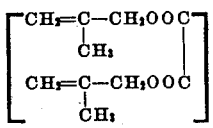

boiled at 85° C. to 90° C. at a pressure of about 1.0 mm. of mercury.

Example V 113 gm. (0.896 mol.) of oxalic acid

[(COOH)₂.2H₂O]

were mixed with 255 gm. of anhydrous allyl alcohol and the mixture placed in the kettle of a dehydrating still.

The mixture was heated to its boiling temperature and the water formed and liberated during the reaction was continuously distilled from the reaction mixture. There was no rearrangement of the allyl alcohol to propionaldehyde.

When the reaction was complete and all the water had been removed by distillation, the residue was fractionated under atmospheric pressure.

The main reaction product was allyl oxalate which was obtained in a yield of 80%. The allyl oxalate boiled at a temperature of 217° C. at atmospheric pressure.

Example VI 100 gm. (1.39 mols.) of crotyl alcohol (CH₃—CH=CH—CH₂OH)

and 150 gm. (2.5 mols.) of glacial acetic acid were mixed and the mixture was placed in the kettle of a still.

The mixture was heated at its boiling under a heavy reflux. An azetropic mixture containing the reaction product was slowly distilled from the reaction mixture as the reaction proceeded. The condensed distillate was found to contain crotyl acetate, crotyl alcohol, water and acetic acid. This mixture was stratified, dried and fractionated.

The main reaction product was crotyl acetate (CH₃—CH=CH—CH₂—OOCCH₃) which was obtained in a yield of about 76%.

The crotyl acetate boiled at 128° C. to 129° C. at atmospheric pressure.

Example VII 2.0 grams of concentrated phosphoric acid were dissolved in 100 gm. of glacial acetic acid contained in the kettle of a fractionating still.

While the acid solution was vigorously boiled, 50 gm. of anhydrous allyl alcohol was slowly admitted to the kettle. The mixture was slowly distilled under a heavy reflux.

The distillate which boiled at about 84° C. under atmospheric pressure was found to contain allyl acetate, allyl alcohol, water and acetic acid.

This mixture was dried and fractionated. Allyl acetate was obtained in a yield of about 80%.

Example VIII 100 gm. (1.39 mols.) of anhydrous isobutenol were mixed with about 135 gm. (1.7 mols.) of β-crotonic acid (CH₃—CH=CH—COOH) and the mixture placed in the kettle of a fractionating still.

This mixture was distilled under a heavy reflux substantially as described in Example I.

The condensed distillate was a mixture comprising the isobutyl crotonate, water, isobutenol and small amounts of β-crotonic acid. This mixture was washed with water, treated with a small amount of NaHCO₃ to neutralize the free β-crotonic acid, dried and distilled.

Isobutenyl crotonate

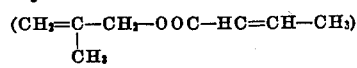

was obtained in a yield of 78%, calculated on the isobutenol used.

Example IX 176 gm. (2.0 mols.) of 2-(hydroxy-methyl)-propene-1-ol-3

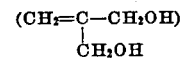

and 176 gm. (2.0 mols.) of isobutyric acid were mixed and the mixture charged to the kettle of a dehydrating still.

The mixture was heated at its boiling point and water formed during the reaction was distilled from the reaction vessel at substantially the same rate at which it was formed.

When the reaction was complete as indicated by the fact that no more water could be removed, the contents of the reaction vessel were distilled under a subatmospheric pressure.

The reaction product was the hydroxy unsaturated isobutyric ester of the formula

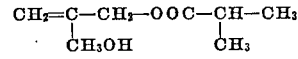

This product was obtained in a yield of about 80%.

158.0 gm. (1.0 mol.) of the hydroxy ester was charged to the kettle of the still and 88 gm. (1.0 mol.) of anhydrous isobutyric acid was added.

This mixture was heated to its boiling point and the water formed during the reaction was distilled from the reaction mixture.

When the reaction was complete, the contents of the flask were distilled under a subatmospheric pressure.

The reaction product was the unsaturated ester of the formula

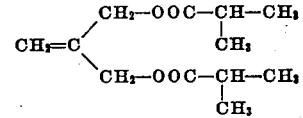

The product was obtained in a yield of about 85%.

The present invention may be executed at any suitable temperature and pressure. The reaction temperature to be employed will depend on the particular reactants, the stability of the reaction product, the method of recovery to be resorted to and on the desired pressure of operation. Relatively low reaction temperatures may be used, in some cases, and the removal of the unsaturated ester or its azeotrope comprising any of the constituents of the reaction mixture may be effected by operating with the reaction system under subatmospheric pressures. When it is desirable to operate at temperatures higher than the atmospheric boiling temperature of the reaction mixture, superatmospheric pressures may be applied.

The unsaturated esters obtained by our method may be used as solvents for numerous dilution and extraction purposes. They possess a high solvent power and are particularly useful when a high boiling solvent or extractant is required. The allyl type esters may also be advantageously used in coating compositions, as softeners for pyroxylin, cellulose esters and resins. They may under certain conditions be hydrolized and rearranged to valuable carbonylic compounds and the corresponding acid. The esters obtained may vary in consistency from liquids to wax-like solids at room temperature. The solid or liquid wax-like esters may be used as substitutes for paraffin wax or the various vegetable waxes in polishes, water-proofing compositions, etc. The unsaturated esters may have varied uses in perfumery and pharmaceutical chemistry.

The above description of the invention and the specific examples included are to be considered as illustrative only and not as limiting the scope of the invention. Any variation therefrom which conforms to the spirit of the invention is intended to be included within the scope of the accompanying claims.

We claim as our invention:

1. A process for the esterification of unsaturated alcohols which comprises reacting a mono-olefinic alcohol containing at least four carbon atoms in an alkyl chain and a carbinol group linked to an aliphatic unsaturated tertiary carbon atom with a carboxylic acid.

2. A process for the esterification of unsaturated alcohols which comprises reacting an unsaturated alcohol containing at least four carbon atoms in an alkyl chain and a carbinol group linked to an aliphatic unsaturated tertiary carbon atom with an aliphatic carboxylic acid.

3. A process for the esterification of unsaturated alcohols which comprises reacting an unsaturated alcohol containing at least four carbon atoms in an alkyl chain and a carbinol group linked to an aliphatic unsaturated tertiary carbon atom with a monocarboxylic acid.

4. A process for the esterification of unsaturated alcohols which comprises reacting a mono-olefinic alcohol containing an open chain unsaturated tertiary carbon atom and a carbinol group linked to an aliphatic unsaturated tertiary carbon atom with a carboxylic acid.

5. A process for the esterification of unsaturated alcohols which comprises reacting an unsaturated alcohol containing at least four carbon atoms in an alkyl chain and a carbinol group linked to an aliphatic unsaturated tertiary carbon atom with an aliphatic unsaturated carboxylic acid containing at least four carbon atoms in an alkyl chain.

6. A process for the esterification of unsaturated alcohols which comprises reacting a mono-olefinic alcohol containing at least four carbon atoms in an alkyl chain and a carbinol group linked to an aliphatic unsaturated tertiary carbon atom with a polybasic carboxylic acid.

7. A process for the esterification of unsaturated alcohols which comprises reacting an unsaturated alcohol containing an open chain unsaturated tertiary carbon atom and a carbinol group linked to an aliphatic unsaturated tertiary carbon atom with an aliphatic unsaturated carboxylic acid.

8. A process for the esterification of unsaturated alcohols which comprises reacting an unsaturated alcohol containing an open chain unsaturated tertiary carbon atom and a carbinol group linked to an aliphatic unsaturated tertiary carbon atom with an aliphatic polybasic carboxylic acid.

9. A process for the esterification of unsaturated alcohols which comprises reacting a mono-olefinic alcohol containing an open chain unsaturated tertiary carbon atom and a carbinol group linked to an aliphatic unsaturated carbon atom with isobutyric acid.

10. A process for the esterification of unsaturated alcohols which comprises reacting isobutenol with a carboxylic acid containing at least three carbon atoms.

11. A process for the production of isobutenyl isobutyrate which comprises reacting isobutenol with isobutyric acid.

12. The unsaturated ester corresponding to the reaction product of a mono-olefinic alcohol containing at least four carbon atoms in an alkyl chain and a carbinol group linked to an open chain unsaturated tertiary carbon atom with an unsaturated carboxylic acid containing at least four aliphatic carbon atoms in an alkyl chain.

13. The unsaturated ester containing the isobutenyl radical linked to a carboxy group of a carboxylic acid containing at least three carbon atoms in an aliphatic chain.

14. The unsaturated ester containing the radical of the formula

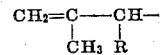

wherein R is a hydrocarbon radical, linked to a carboxy group of a carboxylic acid.

15. The unsaturated ester containing the isobutenyl radical linked to the carboxy group of a saturated monocarboxylic acid containing at least three carbon atoms.

16. The unsaturated ester containing the isobutenyl radical linked to a carboxy group of a polycarboxylic acid.

17. The unsaturated ester containing an open chain unsaturated tertiary carbon atom linked by a single bond to an aliphatic carbon atom which in turn is linked to a carboxy group of an aliphatic polycarboxylic acid.

18. The unsaturated ester containing an unsaturated tertiary carbon atom linked by single bonds to two carbon atoms each of which is in turn linked to a separate carboxy group of a dicarboxylic acid.

19. An essentially neutral ester of an unsaturated normal aliphatic monohydric alcohol wherein the carbinol group is linked to an aliphatic unsaturated tertiary carbon atom, with an aliphatic polycarboxylic acid having at least five carbon atoms.

20. An essentially neutral ester of an aliphatic polycarboxylic acid having at least five carbon atoms wherein at least one of the hydrogens of the carboxyl groups is replaced by the radical of an unsaturated normal aliphatic monohydric alcohol wherein the carbinol group is linked to an aliphatic unsaturated tertiary carbon atom.

21. An essentially neutral ester of an unsaturated normal aliphatic, monohydric alcohol having at least four carbon atoms and an unsaturated tertiary carbon atom with a polycarboxylic acid selected from the group consisting of glutaric acid and citric acid.

22. An unsaturated ester containing at least seven carbon atoms in the molecule, in the alcohol radical of which there is an olefinic linkage between two aliphatic carbon atoms at least one of which is tertiary, and in the carboxylic acid radical of which there are at least three carbon atoms in an aliphatic chain.

HERBERT P. A. GROLL.
GEORGE HEARNE.